United States Patent
Koyanagi et al.

(10) Patent No.: US 7,034,885 B1
(45) Date of Patent: Apr. 25, 2006

(54) IMAGE PROCESSING CIRCUIT

(75) Inventors: Yukio Koyanagi, Joetsu (JP); Kazuo Toraichi, Sayama (JP)

(73) Assignee: Niigata Seimitsu Co., Ltd., Niigata (JP)

( * ) Notice: Subject to any disclaimer, the term of this patent is extended or adjusted under 35 U.S.C. 154(b) by 0 days.

(21) Appl. No.: 09/913,173

(22) PCT Filed: Apr. 20, 2000

(86) PCT No.: PCT/JP00/02565

§ 371 (c)(1),
(2), (4) Date: Aug. 9, 2001

(87) PCT Pub. No.: WO00/64158

PCT Pub. Date: Oct. 26, 2000

(30) Foreign Application Priority Data

Apr. 20, 1999 (JP) .................................. 11-112903

(51) Int. Cl.
*H04N 11/20* (2006.01)
*G06K 9/36* (2006.01)

(52) U.S. Cl. ........................ 348/441; 382/240

(58) Field of Classification Search ............... 348/441, 348/443, 446, 448, 458, 459, 455, 447; 382/300, 382/299, 298, 276, 269; 375/240.17

See application file for complete search history.

(56) References Cited

U.S. PATENT DOCUMENTS

| | | | | |
|---|---|---|---|---|
| 5,754,618 | A * | 5/1998 | Okamoto et al. | 378/4 |
| 5,875,268 | A * | 2/1999 | Miyake | 382/276 |
| 5,946,044 | A * | 8/1999 | Kondo et al. | 348/458 |
| 5,991,463 | A * | 11/1999 | Greggain et al. | 382/298 |
| 6,229,570 | B1 * | 5/2001 | Bugwadia et al. | 348/441 |
| 6,262,773 | B1 * | 7/2001 | Westerman | 348/448 |
| 6,266,092 | B1 * | 7/2001 | Wang et al. | 348/448 |
| 6,266,454 | B1 * | 7/2001 | Kondo | 382/300 |
| 6,292,591 | B1 * | 9/2001 | Kondo | 382/240 |
| 6,295,091 | B1 * | 9/2001 | Huang | 348/448 |
| 6,323,905 | B1 * | 11/2001 | Kondo et al. | 348/441 |
| 6,333,762 | B1 * | 12/2001 | Yoo et al. | 348/441 |
| 6,661,838 | B1 * | 12/2003 | Koga et al. | 375/240 |

FOREIGN PATENT DOCUMENTS

JP 9-74543 3/1997

* cited by examiner

*Primary Examiner*—Paulos M. Natnael
(74) *Attorney, Agent, or Firm*—Dellett & Walters

(57) ABSTRACT

An image processing circuit capable of carrying out high-speed processing and improving the horizontal and vertical resolutions even with its simple structure. The pixel values a to i of a total of nine pixels, three pixels in the horizontal direction along a scanning line by three pixels in the vertical direction in which the line and adjacent lines are abreast, are extracted by a pixel value extracting section. The pixel values A1 to A4 of four pixels Q1 to Q4 generated additionally around the center pixel P5 are determined by calculation by a pixel value calculation section. These pixel values are outputted in units of one scanning line by correlating them with two scanning lines by a pixel value output section.

9 Claims, 7 Drawing Sheets

IMAGE PROCESSING CIRCUIT

TECHNICAL FIELD

The present invention relates to an image processing circuit for improving the resolution by increasing the number of pixels making up a display screen through an interpolation process.

BACKGROUND ART

Generally, one of the methods for improving the quality of a television image involves increasing the number of scanning lines as well as increasing the number of horizontal pixels. For example, a video signal of the current NTSC system has a vertical resolution of about 300 lines owing to interlaced scanning at 2:1. The CRT used in the typical television receiver has 525 scanning lines, and a lower resolution due to interlaced scanning, for which there is known a method of improving the resolution in a vertical direction by increasing the number of pixels in the vertical direction through the field interpolation using a field buffer to make non-interlace.

Some CRTs used in the high definition television receivers have a set number of horizontal pixels about twice as many as that of the CRTs of the ordinary television receivers, and thus, there is known a method for improving the resolution in a horizontal direction by doubling the number of pixels in a scanning line direction by interpolation.

By the way, when the number of vertical pixels is to be increased in order to improving the quality of a television image as described above, a field buffer having a large capacity is required for interpolation, which leads to a problem with the larger circuit. In particular, the interpolation process in the horizontal direction and the interpolation process in the vertical direction are required to be effected in a short time, for example, within 1/60 seconds for one screen. Therefore, there is a need for an image processing circuit capable of performing the interpolation processes in the horizontal and vertical directions at high speed with hardware of simple structure without making arithmetic operation by the processor.

DISCLOSURE OF THE INVENTION

The present invention has been devised in view of the aforementioned problems, and it is an object of the invention to provide an image processing circuit capable of carrying out high-speed processing and improving the horizontal and vertical resolutions even with its simple circuit configuration.

An image processing circuit of the invention to transform the number of pixels in the horizontal and vertical directions into substantially twice by performing an interpolation process based on the pixel values of the pixels arranged regularly in the horizontal and vertical directions comprises pixel value extracting unit for extracting the pixel values of a total of nine pixels, three pixels in the horizontal direction by three pixels in the vertical direction, and pixel value calculating unit for calculating the pixel values of four pixels generated additionally corresponding to positions on the straight lines connecting a central pixel arranged in the center of the nine pixels and four peripheral pixels arranged in the oblique directions of the central pixel and at one-quarter the distance from the central pixel to the four peripheral pixels, on the basis of the pixel values of the nine pixels output from the pixel value extracting unit. Also, an image processing circuit of the invention to transform the number of scanning lines corresponding to an input signal and the number of pixels in the direction along the scanning line into substantially twice comprises pixel value extracting unit for extracting the pixel values of a total of nine pixels, three pixels in the horizontal direction along a scanning line by three pixels in the vertical direction in which the line and adjacent lines are abreast, from the pixel values of a plurality of pixels making up three adjacent scanning lines, in which the pixel values of pixels contained in the scanning line are input in a predetermined order corresponding to the scan direction of the scanning line, pixel value calculating unit for calculating the pixel values of four pixels generated additionally corresponding to positions on the straight lines connecting a central pixel arranged in the center of the nine pixels and four peripheral pixels arranged in the oblique directions of the central pixel and at one-quarter the distance from the central pixel to the four peripheral pixels, on the basis of the pixel values of the nine pixels extracted by the pixel value extracting unit, and pixel value output unit for outputting the pixel values of a plurality of generated pixels in units of column in order by arranging the generated pixels having the pixel values calculated by the pixel value calculating unit in two columns along a horizontal direction by correlating them with one scanning line corresponding to the input signal.

An image processing circuit of the invention has four pixels generated additionally around a central pixel on the basis of the pixel values of nine pixels, in which this generation process is performed while shifting the central pixel in a scan direction in order to transform the number of pixels in each of the horizontal and vertical directions into substantially twice. In particular, when the four pixels are generated additionally around the central pixel, the pixel values of a total of nine pixels including this central pixel are only employed. Hence, there is a small number of pixels to be processed, and it is possible to simplify a pixel generation (pixel value calculation) process and a circuit configuration for performing the process as well as carrying out high-speed processing.

It is desirable that the pixel value extracting unit outputs in parallel the pixel value of a first pixel input at a predetermined timing, the pixel value of a second pixel delayed by one pixel from the output timing of the first pixel, the pixel value of a third pixel delayed by two pixels from the output timing of the first pixel, the pixel value of a fourth pixel delayed by one scanning line from the output timing of the first pixel, the pixel value of a fifth pixel delayed by one scanning line from the output timing of the second pixel, the pixel value of a sixth pixel delayed by one scanning line from the output timing of the third pixel, the pixel value of a seventh pixel delayed by two scanning lines from the output timing of the first pixel, the pixel value of an eighth pixel delayed by two scanning lines from the output timing of the second pixel, and the pixel value of a ninth pixel delayed by two scanning lines from the output timing of the third pixel. In this way, the pixel values of nine pixels used in the pixel value calculating unit can be prepared only by delaying the timing of outputting the pixel value of each pixel to be input in scan order by a predetermined time.

Also, it is desirable that the pixel value calculating unit sets the pixel values A1, A2, A3, A4 of four pixels generated additionally around the central pixel such that:

$$A1 = \{Ne + (a+b+d) - (c+f+g+h+i)\}/(N-2)$$

$$A2 = \{Ne + (b+c+f) - (a+d+g+h+i)\}/(N-2)$$

$$A3 = \{Ne + (d+g+h) - (a+b+c+f+i)\}/(N-2)$$

$$A4 = \{Ne + (f+h+i) - (a+b+c+d+g)\}/(N-2)$$

where the pixel values of nine pixels including the central pixel are a, b, c, d, e, f, g, h, and i in the input order, and N is an integer of 3 or greater. The pixel values of pixels generated additionally around the central pixel are most affected by the central pixel that is located closest thereto. If the pixel value of each pixel is obtained through a convolution operation with a sampling function, it is preferable that the pixel value of a pixel located within the interval of adjacent pixels may be added, and the pixel value of a pixel located outside the interval of adjacent pixels may be subtracted. Accordingly, for the nine pixels arranged in three columns and three rows, the pixel values of the pixels as viewed from the upper left in the horizontal direction are a through i, for example, and considering the pixel value of a pixel generated additionally on the upper left hand of the central pixel, the pixel value e of the central pixel has the greatest effect, the pixel values a, b, d of three pixels located next closest are considered on the plus side, and the pixel values c, f, g, h, i of remaining five pixels are considered on the minus side, resulting in the value A1. Also, the pixel values A2, A3, A4 of other three pixels generated additionally are the same, and have the respective values as mentioned above. The pixel values A1 through A4 of four pixels set in this way are obtained by simply adding or subtracting the respective pixel values, excluding the pixel value e of the central pixel, whereby the processed contents (calculation contents) are simplified, and it is possible to carry out high-speed processing and provide the simple circuit structure. Also, the value of N is desirably set to 10. As a result of examination by the present inventors, it has been confirmed that a clear enlarged image can be obtained by setting N to a value near 10.

Also, the pixel value extracting unit may set the pixel values A1, A2, A3, A4 of four pixels generated additionally around the central pixel such that:

$$A1 = \{Me+(a+b+d)-(f+h+i)\}/M$$

$$A2 = \{Me+(b+c+f)-(d+g+h)\}/M$$

$$A3 = \{Me+(d+g+h)-(b+c+f)\}/M$$

$$A4 = \{Me+(f+h+i)-(a+b+d)\}/M$$

where M is an integer of 2 or greater. Since the pixel value of any pixel generated additionally is mostly reflected by a variation of the pixel value along a direction of the line connecting this pixel and the central pixel, it is thought that the pixel values of two pixels present in the direction almost perpendicular to this direction may be negligible in effect without too great influence. Accordingly, for the nine pixels arranged in three columns and three rows, the pixel values of the pixels as viewed from the upper left in the horizontal direction are a through i, for example, and considering the pixel value of a pixel generated additionally on the upper left hand of the central pixel, the pixel value e of the central pixel has the greatest effect, the pixel values a, b, d of three pixels located next closest are considered on the plus side, the pixel values f, h, i of other three pixels are considered on the minus side, and the pixel values c, g of remaining two pixels are not considered, resulting the value A1 as mentioned above. In this way, each of the pixel values A1 and A4 of two pixels arranged across the central pixel contains commonly (a+b+d) and (f+h+i) as the same processing unit, and each of the pixel values A2 and A3 of remaining two pixels contains commonly (b+c+f) and (d+g+h) as the same processing unit. Hence, the circuit can be further simplified by sharing these processings. Also, the value of M is desirably set to 8. As a result of examination by the present inventors, it has been confirmed that a clear enlarged image can be obtained by setting M to a value near 8.

Also, the pixel value extracting unit may set the pixel values A1, A2, A3, A4 of four pixels generated additionally such that:

$$A1 = \{Le+2b+2d-(c+f+g+h)\}/L$$

$$A2 = \{Le+2b+2f-(a+d+h+i)\}/L$$

$$A3 = \{Le+2d+2h-(a+b+f+i)\}/L$$

$$A4 = \{Le+2f+2h-(b+c+d+g)\}/L$$

where L is an integer of 2 or greater. If the pixel value of any pixel generated additionally is to be strictly calculated using a sampling function, it can be thought that the pixel values of pixels arranged the distance equal to integral times the interval of adjacent pixels among the nine pixels have almost no effect. Accordingly, for the nine pixels arranged in three columns and three rows, the pixel values of the pixels as viewed from the upper left in the horizontal direction are a through i, for example, and considering the pixel value of a pixel generated additionally on the upper left hand of the central pixel, it is possible to ignore the effect of the pixel values of two pixels arranged on the upper left hand and the lower right hand, among the nine pixels, and other pixels are weighted at a predetermined value corresponding to the distance from the pixel generated additionally to respective pixels, resulting in the value A1. In this way, the pixel value can be obtained by reflecting the result of strict calculation using the sampling function. Also, the value of L is desirably set to 10. If the weighting factor for the pixel values a through i is obtained by calculation using the sampling function, the value of L is near 10. Hence, with the above settings, the pixel values can be obtained through the strict calculation using the sampling function.

Also, the pixel value output unit desirably comprises first scanning line generating unit for storing and outputting the pixel values of two pixels generated additionally corresponding to the pixel contained in one scanning line where the central pixel is not contained in the order of arrangement along this scanning line, and second scanning line generating unit for storing and outputting the pixel values of two pixels generated additionally corresponding to the pixel contained in the other scanning line where the central pixel is not contained in the order of arrangement along this scanning line, and comprises output pixel value selecting unit for selecting alternately the output operation of consecutive pixel values of one scanning line by the first and second scanning line generating unit to be made in the first scanning line generating unit or the second scanning line generating unit. From the above pixel value calculating unit the pixel values of generated pixels arranged in two columns corresponding to one scanning line of an input signal are output in succession. Hence, the pixel values corresponding to respective columns are stored in the first and second scanning line generating unit in succession, and the output operation of these pixel values is performed alternately by the first and second scanning line generating unit. Thereby, two scanning lines can be generated additionally corresponding to one scanning line of the input signal, so that the number of scanning lines can be transformed into substantially twice.

BEST MODE FOR CARRYING OUT THE INVENTION

An image processing circuit according to one embodiment of the present invention will be described below with reference to the accompanying drawings. This image processing circuit is contained in a television receiver, for example, and performs an operation of transforming the number of scanning lines and the number of pixels along each scanning line, corresponding to an input (received) signal of the NTSC system into substantially twice.

First Embodiment

Figure 1:
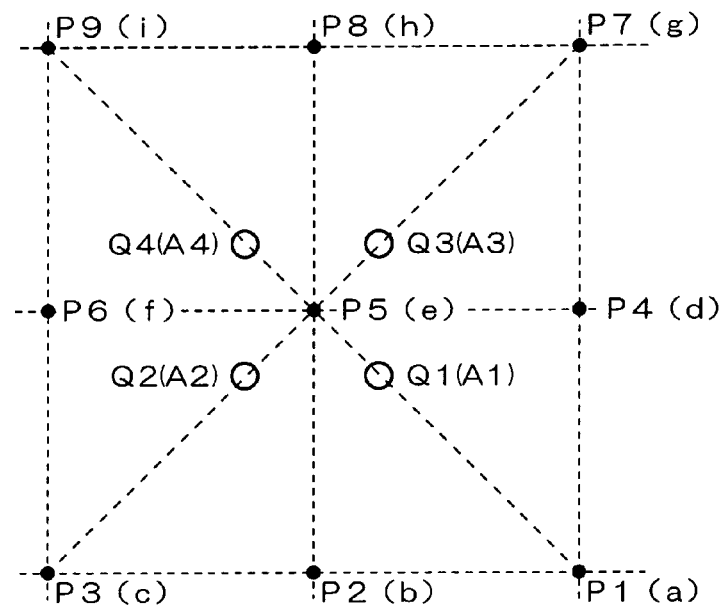
FIG. 1 is a view showing the relation between the pixels contained in three scanning lines to be processed and four pixels generated additionally on the basis of these pixels in the image processing circuit of the first embodiment.

FIG. 1 is a view showing the relation between the pixels contained in three scanning lines to be processed and four pixels generated additionally on the basis of these pixels in the image processing circuit of the first embodiment. A horizontal direction as indicated in FIG. 1 extends along a scanning line corresponding to an input signal, and each pixel along each scanning line of the interlaced scanning that is performed in the television receivers for ground wave broadcasting is indicated by "●". Also, "○" indicates a pixel generated additionally by the arrangement of the pixels on an original scanning line and through an interpolation process of these pixel values.

In this embodiment, on the basis of the pixel values of three pixels along each of three adjacent scanning lines, that is, a total of nine pixels, three pixels in the horizontal direction by three pixels in the vertical direction in which the line and adjacent lines are abreast, four pixels are generated additionally around the center pixel of these nine pixels, as shown in FIG. 1.

Suppose that the nine pixels along the scanning lines are P1, P2, P3, P4, P5, P6, P7, P8 and P9 in the scan order, and the pixel values are a, b, c, d, e, f, g, h, and i. Also, suppose that a pixel Q1 is generated additionally at a position on a straight line connecting the central pixel P5 and the lower right pixel P1 and one-quarter the distance from the central pixel P5 to the pixel P1, a pixel Q2 is generated additionally at a position on a straight line connecting the central pixel P5 and the lower left pixel P3 and one-quarter the distance from the central pixel P5 to the pixel P3, a pixel Q3 is generated additionally at a position on a straight line connecting the central pixel P5 and the upper right pixel P7 and one-quarter the distance from the central pixel P5 to the pixel P7, and a pixel Q4 is generated additionally at a position on a straight line connecting the central pixel P5 and the upper left pixel P9 and one-quarter the distance from the central pixel P5 to the pixel P9.

In general, the pixel values of four pixels Q1, Q2, Q3 and Q4 generated additionally around the central pixel P5 are most affected by the central pixel P5 located closest. Also, considering a case of calculating the pixel value of each pixel by a convolution operation using a sampling function, it is preferable that the pixel value of pixel located within the interval of adjacent pixels (e.g., interval between the pixels P5 and P4, or between the pixels P3 and P2) may be added, and the pixel value of pixel located outside the interval of adjacent pixels may be subtracted.

Considering the pixel value A1 of a new pixel Q1 located on the lower right hand of the central pixel P5, the pixel value e of the central pixel P5 has the greatest effect, the pixel values a, b, d of three pixels P1, P2, P4 located next closest are considered on the plus side, and the pixel values c, f, g, h, i of remaining five pixels P3, P6, P7, P8, P9 are considered on the minus side. Accordingly, the pixel value A1 of the pixel Q1 is such as:

$$A1=\{10e+(a+b+d)-(c+f+g+h+i)\}/8 \quad (1)$$

Supposing N to be an integer of 3 or greater, the pixel value A1 of the pixel Q1 can be represented such as:

$$A1=\{Ne+(a+b+d)-(c+f+g+h+i)\}/(N-2)$$

As a result of examination by the present inventors, it has been confirmed that a clear enlarged image can be obtained by setting N to a value near 10, and the above expression (1) can be obtained by setting N to 10.

Similarly, the pixel values A2, A3 and A4 of three pixels Q2, Q3 and Q4 generated additionally around the central pixel P5 can be represented such as:

$$A2=\{Ne+(b+c+f)-(a+d+g+h+i)\}/(N-2)$$

$$A3=\{Ne+(d+g+h)-(a+b+c+f+i)\}/(N-2)$$

$$A4=\{Ne+(f+h+i)-(a+b+c+d+g)\}/(N-2)$$

Substituting N=10 into the respective expressions, $$A2=\{10e+(b+c+f)-(a+d+g+h+i)\}/8 \quad (2)$$

$$A3=\{10e+(d+g+h)-(a+b+c+f+i)\}/8 \quad (3)$$

$$A4=\{10e+(f+h+i)-(a+b+c+d+g)\}/8 \quad (4)$$

Figure 2:
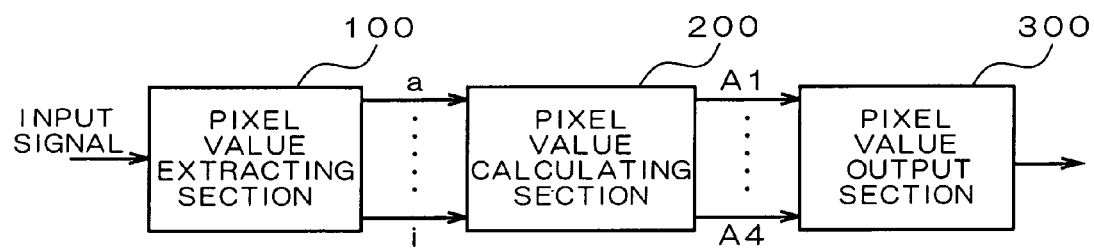
FIG. 2 is a block diagram showing the configuration of the image processing circuit of the first embodiment.

FIG. 2 is a block diagram showing the configuration of the image processing circuit of this embodiment. The image processing circuit of this embodiment as shown in FIG. 2 comprises a pixel value extracting section 100, a pixel value calculating section 200, and a pixel value output section 300.

The pixel value extracting section 100 extracts the pixel values a through i of nine pixels as shown in FIG. 1 from among the pixel values of the pixels contained in three adjacent scanning lines included in an input signal. For example, if an RGB signal is considered as the input signal, the image processing circuits as shown in FIG. 2 corresponding to the respective color components of R, G and B are provided, and the pixel value extracting section 100 extracts the pixel values of nine pixels for an input R signal (or G signal or B signal). Other input signals than the RGB signal may be used, or the pixel values of nine pixels may be extracted on the basis of an input luminance signal.

The pixel value calculating section 200 calculates the pixel values A1 through A4 of four pixels Q1 through Q4 generated additionally around the central pixel P5 as shown in FIG. 1 on the basis of the pixel values a through i of nine pixels that are output from the pixel value extracting section 100, and outputs these four pixel values in parallel.

The pixel value output section 300 accepts the pixel values A1 through A4 of four pixels Q1 through Q4 that are output from the pixel value calculating section 200. The pixel value output section 300 stores and outputs the pixel values A1 through A4 for each scanning line after transformation. For example, if attention is paid to four pixels Q1 through Q4 generated additionally around the pixel P5, a pixel Q1 and a pixel Q2 are stored corresponding to a first scanning line generated additionally, and a pixel Q3 and a pixel Q4 are stored corresponding to a second scanning line generated additionally, as shown in FIG. 1. By performing such a processing for one scanning line where the pixel P5 is contained, two new scanning lines can be generated additionally corresponding to one scanning line contained in the input signal, whereby the number of pixels contained in two scanning lines generated additionally is substantially twice the number of pixels contained in the original scanning line.

The pixel value extracting section 100 corresponds to pixel value extracting unit; the pixel value calculating section 200 corresponds to pixel value calculating unit; and the pixel value output section 300 corresponds to pixel value output unit.

Figure 3:
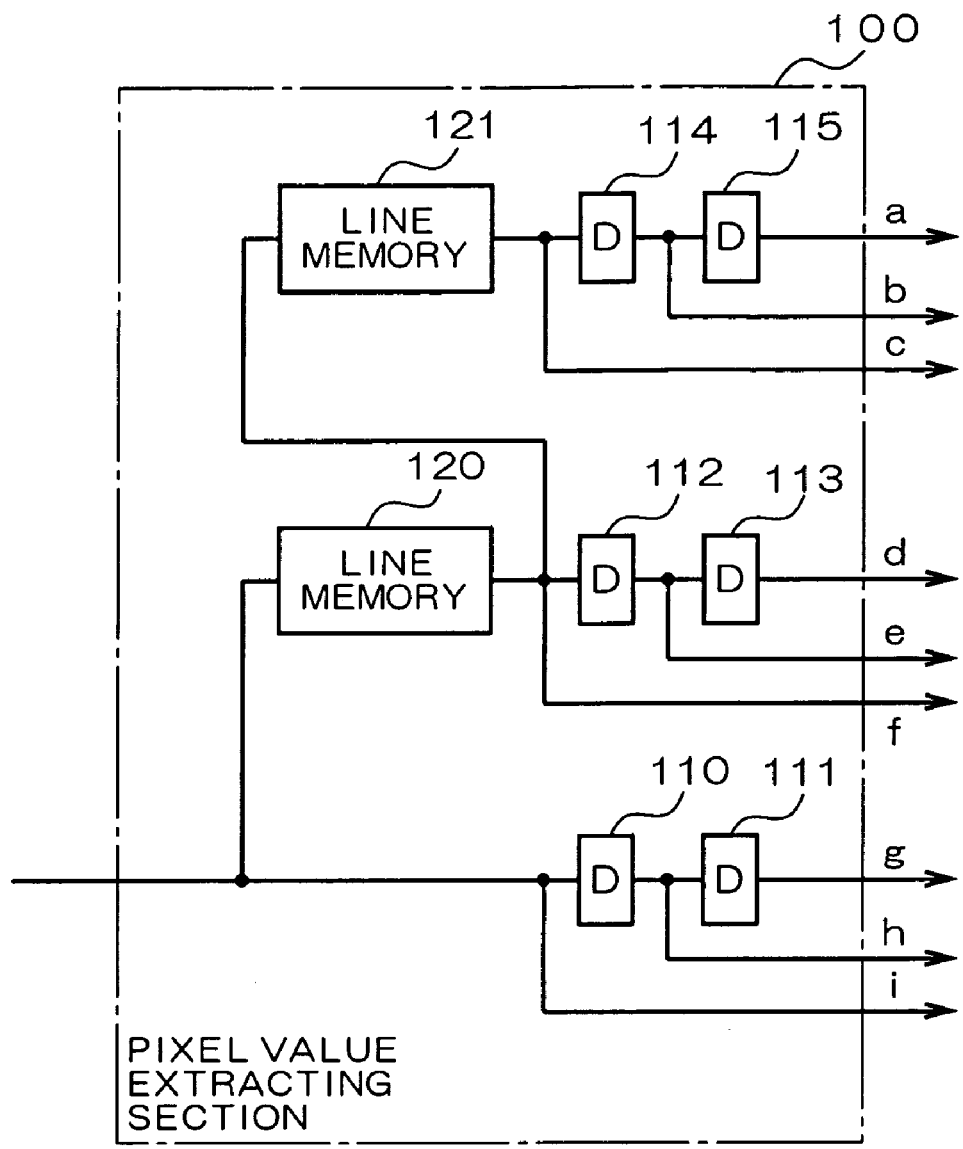
FIG. 3 is a block diagram showing the detailed configuration of the pixel value extracting section included in the image processing circuit as shown in FIG. 2.

FIG. 3 is a block diagram showing the detailed configuration of the pixel value extracting section 100 included in the image processing circuit as shown in FIG. 2. As shown in FIG. 3, the pixel value extracting section 100 comprises six D-type flip-flops (hereinafter referred to as "D-FF") 110 through 115, and two line memories 120, 121.

In this extracting value extracting section 100, the pixel values of the pixels contained in the scanning line corresponding to the input signal as the data (pixel value data) of a predetermined number of bits are input in synchronism with a clock signal CK1 corresponding to a predetermined sampling frequency. The input pixel value data are input into two D-FFs 110, 111 connected in tandem and a line memory 120 and two D-FFs 112, 113 connected in tandem, respectively. The pixel value data of the pixels output from the line memory 120 are input into a line memory 121 and the D-FFs 114, 115 connected in tandem. Each of the line memories 120, 121 is a first-in first-out memory for storing the pixel values of the pixels in number corresponding to one scanning line of the input signal in the input order, and outputs the pixel value data of the input pixels at a timing delayed by one scanning line.

Accordingly, considering the time at which the pixel value data (pixel value i) corresponding to a pixel P9 arranged at the upper left hand of the central pixel P5 in FIG. 1 is input into the pixel value extracting section 100, the pixel value data (pixel value h) of a pixel P8 input ahead by one pixel is output from a D-FF 110, and the pixel value data (pixel value g) of a pixel P7 input ahead by two pixels is output from a D-FF 111. Also, the pixel value data (pixel value f) of a pixel P6 input ahead by one scanning line is output from the line memory 120, the pixel value data (pixel value e) of the central pixel P5 input ahead by one scanning line and one pixel is output from a D-FF 112, and the pixel value data (pixel value d) of a pixel P4 input ahead by one scanning line and two pixels is output from a D-FF 113. Further, the pixel value data (pixel value c) of a pixel P3 input ahead by two scanning lines is output from the line memory 121, the pixel value data (pixel value b) of a pixel P2 input ahead by two scanning lines and one pixel is output from a D-FF 114, and the pixel value data (pixel value a) of a pixel P1 input ahead by two scanning lines and two pixels is output from a D-FF 115. In this way, the pixel value data corresponding to nine pixels P1 through P9 as shown in FIG. 1 are output in parallel from the pixel value extracting section 100.

Figure 4:
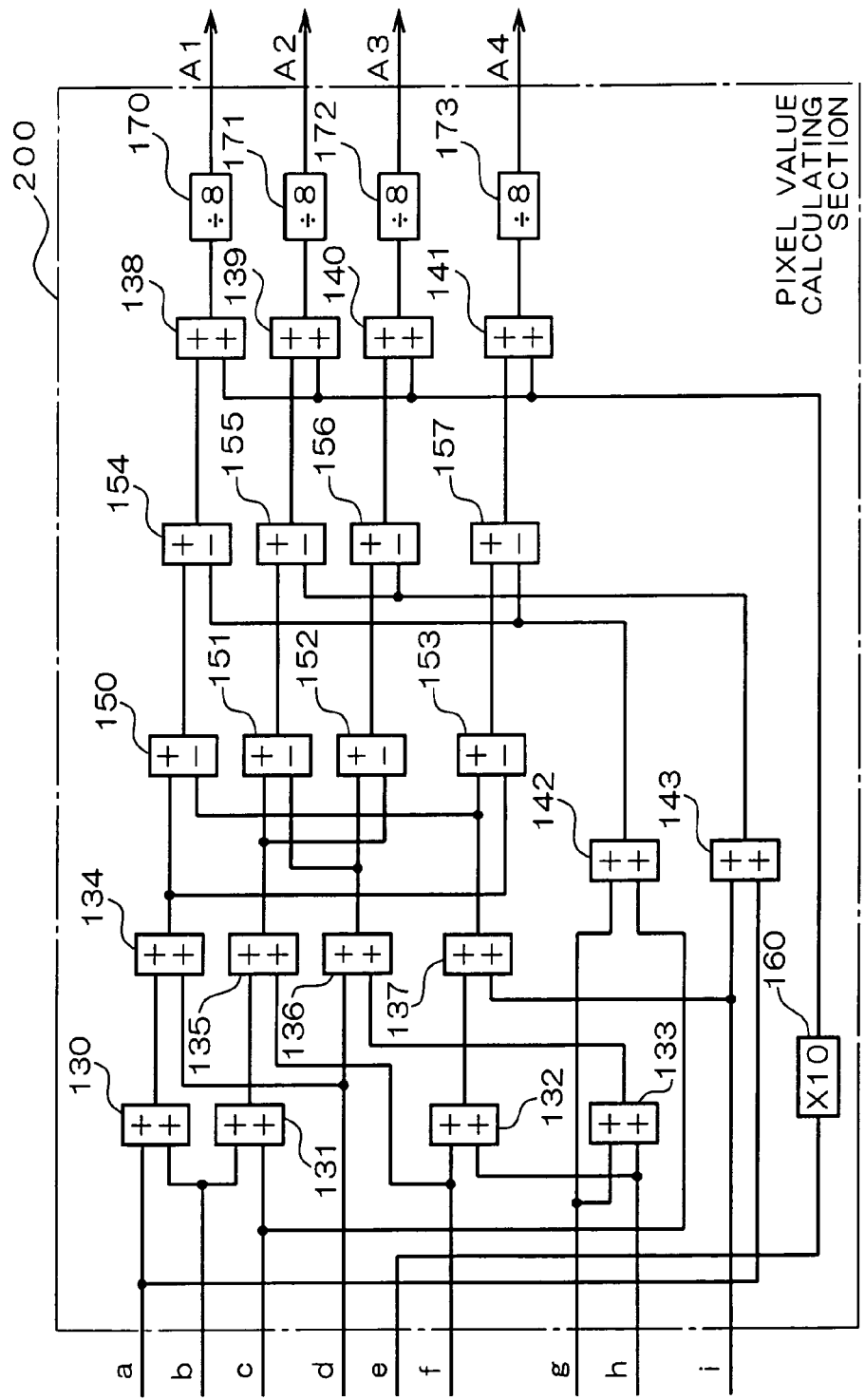
FIG. 4 is a block diagram showing the detailed configuration of the pixel value calculating section included in the image processing circuit as shown in FIG. 2.

FIG. 4 is a circuit diagram showing the detailed configuration of the pixel value calculating section 200 included in the image processing circuit as shown in FIG. 2. As shown in FIG. 4, the pixel value calculating section 200 comprises fourteen adders 130 through 143, eight subtracters 150 through 157, a multiplier 160 for making tenfold multiplication, and four dividers 170 through 173 for dividing the input value by a divisor 8. In the following, the operation of the pixel value calculating section 200 for calculating the pixel values A1 through A4 of four pixels Q1 through Q4 will be described for each pixel, employing the expressions (1) through (4).

The calculation process of the pixel value A1 is performed using the adders 130, 132, 134, 137, 138, 142 and the subtracters 150, 154. More specifically, three pixel values a, b, d are added by two adders 130, 134, three pixel values f, h, i are added by other two adders 132, 137, and two pixel values c, g are added by the other single adder 142. And three addition results are input into two subtracters 150, 154, respectively, so that an output value (a+b+d) that is an addition result output from an adder 134 subtracted by a value (c+f+g+h+i) that is a sum of the addition results output from the adders 137, 142 is output from a subtracter 154 in the latter stage. Accordingly, a multiplication result (10e) of the multiplier 160 is added to this output value by an adder 138, so that an addition result {10e+(a+b+d)−(c+f+g+h+i)} is output. Further a divider 170 connected in the latter stage makes division by a divisor 8, resulting in the pixel value A1 as indicated in the expression (1), and this calculation result is output from the divider 170.

The calculation process of the pixel value A2 is performed using the adders 131, 133, 135, 136, 139, 143 and the subtracters 151, 155. More specifically, three pixel values b, c, f are added by two adders 131, 135, three pixel values d, g, h are added by other two adders 133, 136, and two pixel values a, i are added by the other single adder 143. And three addition results are input into two subtracters 151, 155, respectively, so that an output value (b+c+f) that is an addition result output from an adder 135 subtracted by a value (a+d+g+h+i) that is a sum of the addition results output from the adders 136, 143 is output from a subtracter 155 in the latter stage. Accordingly, a multiplication result (10e) of the multiplier 160 is added to this output value by an adder 139, so that an addition result {10e+(b+c+f)−(a+ d+g+h+i)} is output. Further a divider 171 connected in the latter stage makes division by a divisor 8, resulting in the pixel value A2 as indicated in the expression (2), and this calculation result is output from the divider 171.

The calculation process of the pixel value A3 is performed using the adders 131, 133, 135, 136, 140, 143 and the subtracters 152, 156. More specifically, three pixel values d, g, h are added by two adders 133, 136, three pixel values b, c, f are added by other two adders 131, 135, and two pixel values a, i are added by the other single adder 143. And three addition results are input into two subtracters 152, 156, respectively, so that an output value (d+g+h) that is an addition result output from an adder 136 subtracted by a value (a+b+c+f+i) that is a sum of the addition results output from the adders 135, 143 is output from a subtracter 156 in the latter stage. Accordingly, a multiplication result (10e) of the multiplier 160 is added to this output value by an adder 140, so that an addition result {10e+(d+g+h)−(a+b+c+f+i)} is output. Further a divider 172 connected in the latter stage makes division by a divisor 8, resulting in the pixel value A3 as indicated in the expression (3), and this calculation result is output from the divider 172.

The calculation process of the pixel value A4 is performed using the adders 130, 132, 134, 137, 141, 142 and the subtracters 153, 157. More specifically, three pixel values f, h, i are added by two adders 132, 137, three pixel values a, b, d are added by other two adders 130, 134, and two pixel values c, g are added by the other single adder 142. And three addition results are input into two subtracters 153, 157, respectively, so that an output value (f+h+i) that is an addition result output from an adder 137 subtracted by a value (a+b+c+d+g) that is a sum of the addition results output from the adders 134, 142 is output from a subtracter 157 in the latter stage. Accordingly, a multiplication result (10e) of the multiplier 160 is added to this output value by an adder 141, so that an addition result {10e+(f+h+i)−(a+b+c+d+g)} is output. Further a divider 173 connected in the latter stage makes division by a divisor 8, resulting in the pixel value A4 as indicated in the expression (4), and this calculation result is output from the divider 173.

In this way, the pixel values of the pixels are simply added or subtracted, except for multiplying the pixel value e of the central pixel P5 tenfold. Hence, the processing contents can be simplified, and it is possible to carry out high-speed processing and provide the simple circuit configuration.

The pixel value calculating section 200 as shown in FIG. 4 is provided with four dividers 170 through 173, in which an addition result output from the corresponding adder is divided by a divisor 8. However, these dividers 170 through 173 can be realized by the three-bit shift circuits, that is, only by wiring the output lines of the adders 138 through 141 shifted by three bits. Also, in displaying an image on the CRT (Cathode Ray Tube), it is required that each pixel value that is digital data is finally converted into an analog signal, but an equivalent operation to the division process by the dividers 170 through 173 can be effected by adjusting the gain in this conversion process. Hence, the four dividers 170 through 173 may be removed from the pixel value calculating section 200 shown in FIG. 4.

Figure 5:
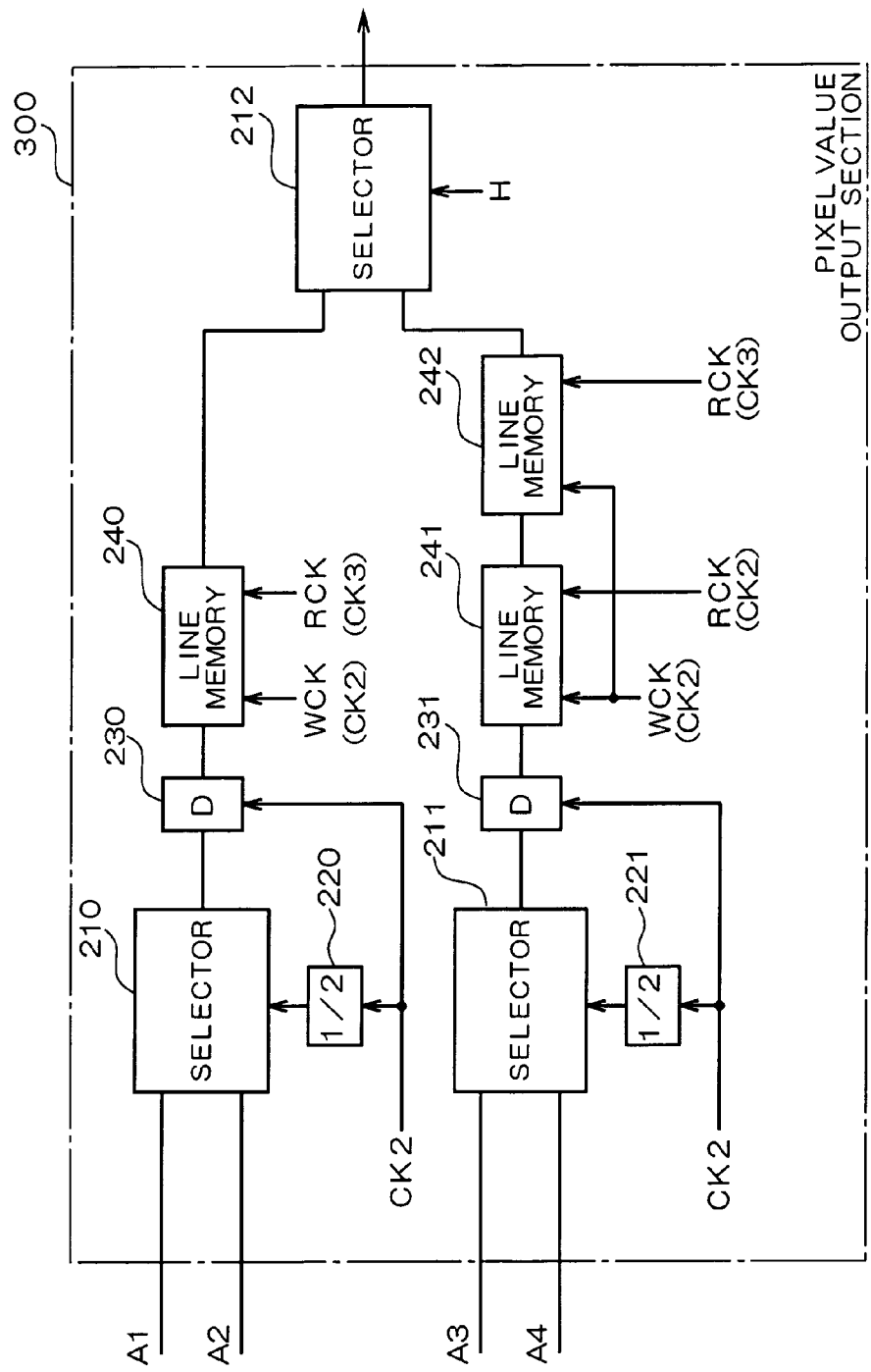
FIG. 5 is a block diagram showing the detailed configuration of the pixel value output section included in the image processing circuit as shown in FIG. 2.

FIG. 5 is a block diagram showing the detailed configuration of the pixel value output section 300 included in the image processing circuit as shown in FIG. 2. As shown in FIG. 5, the pixel value output section 300 comprises three selectors 210 through 212, two frequency demultipliers 220, 221, two D-FFs 230, 231, and three line memories 240 through 242. A selector 210, a frequency demultiplier 220, a D-FF 230, and a line memory 240 correspond to first scanning line generating unit; a selector 211, a frequency demultiplier 221, a D-FF 231, and the line memories 241, 242 correspond to second scanning line generating unit; and a selector 212 corresponds to output pixel value selecting unit.

The selector 210 selects alternately the pixel value data corresponding to the pixel values A1, A2 input concurrently from the pixel value calculating section 200, and outputs it. The selection timing is set by a signal output from the frequency demultiplier 220. This frequency demultiplier 220 receives a clock signal CK2 having twice the frequency of a clock signal CK1 corresponding to the sampling frequency of each pixel data input into the pixel value extracting section 100 as shown in FIG. 3 and outputs a signal with the frequency divided by two. Accordingly, the selector 210 having a selected state determined by the signal with the frequency of clock signal CK2 divided by 2 outputs alternately the pixel value data of the pixel values A1, A2 at an interval that is one-half the input interval of the pixel value data into the pixel value extracting section 100. The pixel data value corresponding to the pixel value A1 and the pixel value data corresponding to the pixel value A2 that are output alternately are once held in the D-FF 230, and then input into the line memory 240. The line memory 240 is a first-in first-out memory for storing in the input order the pixel values of one scanning line corresponding to the first scanning line containing the pixels Q1 and Q2 as shown in FIG. 1, and stores the pixel value data of the pixels input from the D-FF 230 by one scanning line. This line memory 240 makes the write operation of the pixel value data synchronously when a write clock signal WCK is input, and the read operation of the pixel value data synchronously when a read clock signal RCK is input. The write clock signal WCK has the same frequency as the clock signal CK2 as mentioned above, and is input into the line memory 240 over the entire period where the pixel value data is output from the D-FF 230. On one hand, the read clock signal RCK has the same frequency as a clock signal CK3 having twice the frequency of the clock signal CK2, and the line memory 240 outputs the pixel value data at a reading rate twice as fast as a writing rate of the pixel value data when this read clock signal RCK is input. Also, this read clock signal RCK is input over about one-half of the period where the write clock signal WCK is input, so that the pixel value data stored in the line memory 240 may not underflow.

Similarly, the selector 211 selects alternately the pixel value data corresponding to the pixel values A3, A4 input concurrently from the pixel value calculating section 200, and outputs it. The selector 211 having a selected state determined by the signal with the frequency of clock signal CK2 divided by 2 outputs alternately the pixel value data of the pixel values A3, A4 at an interval that is one-half the input interval of the pixel value data into the pixel value extracting section 100. The pixel data value corresponding to the pixel value A3 and the pixel value data corresponding to the pixel value A4 that are output alternately are once held in the D-FF 231, and then input into the line memory 241. The line memory 241 is a first-in first-out memory for storing in the input order the pixel values of one scanning line corresponding to the second scanning line containing the pixels Q3 and Q4 as shown in FIG. 1, and stores the pixel value data of the pixels input from the D-FF 231 by one scanning line. In the latter stage of the line memory 241, a line memory 242 having the same capacity is connected. These line memories 241 and 242 make the write operation of the pixel value data synchronously when a write clock signal WCK is input, and the read operation of the pixel value data synchronously when a read clock signal RCK is input, the same as the aforementioned line memory 240. The line memory 241 in the former stage is employed to delay the input pixel data by one scanning line, and both the write clock signal WCK and the read clock signal RCK are set to the same frequency as the clock signal CK2. Also, the line memory 242 in the latter stage is used for the same purposes as the line memory 240, and performs the write operation of the pixel value data in synchronism with the write clock signal WCK having the same frequency as the clock signal CK2, and the read operation of the pixel value data in synchronism with the read clock signal RCK having the same frequency as the clock signal CK3 having twice the frequency as the clock signal CK2 and over an input period that is about one-half of that of the write clock signal WCK.

The input period of the read clock signal RCK into the line memory 240 corresponding to the first scanning line and the line memory 242 corresponding to the second scanning line are alternately switched for each scanning line, whereby after the pixel value data of the pixels Q1, Q2 corresponding to the first scanning line are output by one scanning line from the line memory 240, the pixel value data of the pixels Q3, Q4 corresponding to the second scanning line are output by one scanning line from the line memory 242. The selector 212 provided in the latter stage of these two line memories 240, 242 switches the selected state, every time a horizontal synchronizing signal H is input, to output alternately the pixel value data by one scanning line output from the line memory 240 and the pixel value data by one scanning line output from the line memory 242.

In this way, the pixel value data of two scanning lines corresponding to the first and second new scanning lines having about twice the number of constituent pixels can be output in the new scan order from the pixel value output section 300, while the pixel value data of one scanning line is input into the pixel value extracting section 100. For example, when the interlaced scanning is performed, the positions of the pixels Q1 through Q4 generated additionally employing the pixel value data input corresponding to the odd field, and the positions of the pixels Q1 through Q4 generated additionally employing the pixel value data input corresponding to the even field are exactly the same, whereby a progressive image having about twice the number of pixels in the horizontal and vertical directions can be easily produced from an image obtained by interlaced scanning using the image processing circuit as described above.

Second Embodiment

In the above first embodiment, all the pixel values a through i of nine pixels P1 through P9 are employed to calculate the pixel values A1 through A4 of the four pixels Q1 through Q4 located around the central pixel P5 as shown in FIG. 1, but the circuit configuration may be simplified by excluding the pixel values of the pixels which are thought to be less influential in calculating the pixel values A1 through A4 from the calculation object.

Since the pixel values A1 through A4 of the four pixels Q1 through Q4 generated additionally are greatly affected by a variation of pixel value along a direction of the line connecting the pixel values Q1 through Q4 and the central pixel P5, there may be less significant effect by ignoring the influence of the pixel values of two pixels located in a direction substantially perpendicular to this direction.

In this embodiment, considering the pixel value A1 of the pixel Q1 located on the lower right hand of the central pixel P5, the pixel value c of the pixel P3 located on the lower left hand of the central pixel P5 and the pixel value g of the pixel P7 located on the upper right hand of the central pixel P5 are excluded from the calculation object. Accordingly, the pixel value A1 of the pixel Q1 is such as:

$$A1=\{8e+(a+b+d)-(f+h+i)\}/8 \qquad (5)$$

Supposing M to be an integer of 2 or greater, the pixel value A1 of the pixel Q1 can be represented such as:

$$A1=\{Me+(a+b+d)-(f+h+i)\}/M$$

As a result of examination by the present inventors, it has been confirmed that a clear enlarged image can be obtained by setting M to a value near 8, and the above expression (5) can be obtained by setting M to 8.

Similarly, the pixel values A2, A3 and A4 of three pixels Q2, Q3 and Q4 generated additionally around the central pixel P5 can be represented such as:

$$A2=\{Me+(b+c+f)-(d+g+h)\}/M$$

$$A3=\{Me+(d+g+h)-(b+c+f)\}/M$$

$$A4=\{Me+(f+h+i)-(a+b+d)\}/M$$

Substituting M=8 into the respective expressions, $$A2=\{8e+(b+c+f)-(d+g+h)\}/8 \qquad (6)$$

$$A3=\{8e+(d+f+h)-(b+c+f)\}/8 \qquad (7)$$

$$A4=\{8e+(f+h+i)-(a+b+d)\}/8 \qquad (8)$$

Figure 6:
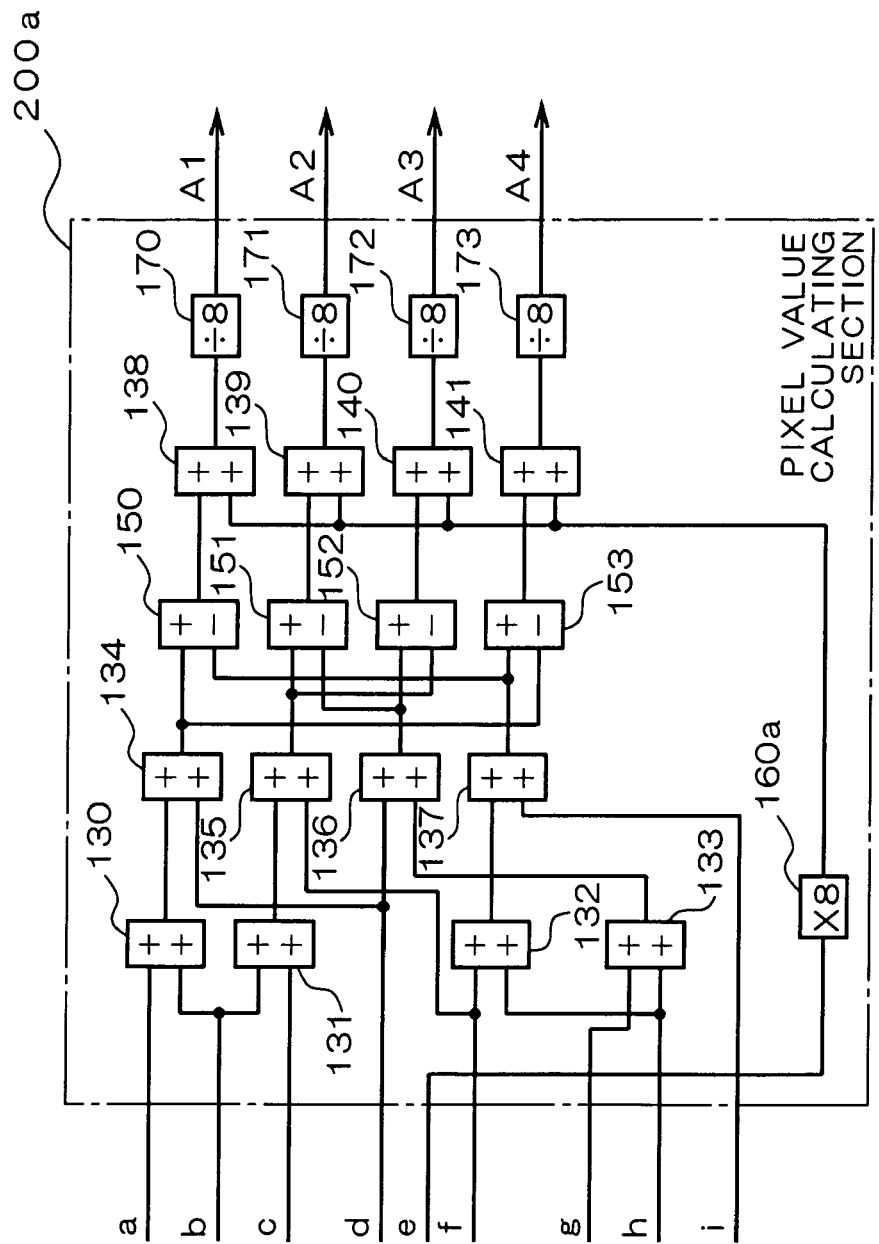
FIG. 6 is a block diagram showing the detailed configuration of a pixel value calculating section in the second embodiment.

FIG. 6 is a block diagram showing the detailed configuration of a pixel value calculating section 200a in this embodiment. The pixel value extracting section 100 connected in the former stage of the pixel value calculating section 200a and the pixel value output section 300 connected in the latter stage are the same as those of the image processing circuit of the first embodiment, and the pixel value calculating section 200a will be only described below.

As shown in FIG. 6, the pixel value calculating section 200a comprises twelve adders 130 through 141, four subtracters 150 through 153, a multiplier 160a for making eightfold multiplication, and four dividers 170 through 173 for dividing the input value by a divisor 8. This pixel value calculating section 200a excludes two adders 142, 143 and four subtracters 154 through 157 from the pixel value calculating section 200 as shown in FIG. 4, and replaces the tenfold multiplier 160 with an eightfold multiplier 160a. A divisor 8 of four dividers 170 through 173 and a multiplier factor 8 of the multiplier 160a are a power of 2, and can be implemented only by shifting the wiring by three bits.

The operation of the pixel value calculating section 200a will be described for each pixel below in the case where the pixel values A1 through A4 of the four pixels Q1 through Q4 are calculated, employing the aforementioned expressions (5) through (8).

A calculation process of the pixel value A1 is performed employing the adders 130, 132, 134, 137, 138 and the subtracter 150. More specifically, three pixel values a, b, d are added by two adders 130, 134, and three pixel values f, h, i are added by other two adders 132, 137. And by inputting these two addition results into the subtracter 150, an output value (a+b+d) that is an addition result output from the adder 134 subtracted by an output value (f+h+i) that is an addition result output from the adder 137 is output. Accordingly, if the adder 138 adds a multiplication result (8e) of the multiplier 160a to this output value, an addition result {8e+(a+b+d)−(f+h+i)} is output. Further the divider 170 connected in the latter stage makes division by a divisor 8 to calculate the pixel value A1 as indicated in the expression (5), its calculation result being output from the divider 170.

A calculation process of the pixel value A2 is performed employing the adders 131, 133, 135, 136, 139 and the subtracter 151. More specifically, three pixel values b, c, f are added by two adders 131, 135, and three pixel values d, g, h are added by other two adders 133, 136. And by inputting these two addition results into the subtracter 151, an output value (b+c+f) that is an addition result output from the adder 135 subtracted by an output value (d+g+h) that is an addition result output from the adder 136 is output. Accordingly, if the adder 139 adds a multiplication result (8e) of the multiplier 160a to this output value, an addition result {8e+(b+c+f)−(d+g+h)} is output. Further the divider 171 connected in the latter stage makes division by a divisor 8 to calculate the pixel value A2 as indicated in the expression (6), its calculation result being output from the divider 171.

A calculation process of the pixel value A3 is performed employing the adders 131, 133, 135, 136, 140 and the subtracter 152. More specifically, three pixel values d, g, h are added by two adders 133, 136, and three pixel values b, c, f are added by other two adders 131, 135. And by inputting these two addition results into the subtracter 152, an output value (d+g+h) that is an addition result output from the adder 136 subtracted by an output value (b+c+f) output from the adder 135 is output. Accordingly, if the adder 140 adds a multiplication result (8e) of the multiplier 160a to this output value, an addition result {8e+(d+g+h)−(b+c+f)} is output. Further the divider 172 connected in the latter stage makes division by a divisor 8 to calculate the pixel value A3 as indicated in the expression (7), its calculation result being output from the divider 172.

A calculation process of the pixel value A4 is performed employing the adders 130, 132, 134, 137, 141 and the subtracter 153. More specifically, three pixel values f, h, i are added by two adders 132, 137, and three pixel values a, b, d are added by other two adders 130, 134. And by inputting these two addition results into the subtracter 153, an output value (f+h+i) that is an addition result output from the adder 137 subtracted by an output value (a+b+d) that is an addition result output from the adder 134 is output. Accordingly, if the adder 141 adds a multiplication result (8e) of the multiplier 160a to this output value, an addition result {8e+(f+h+i)−(a+b+d)} is output. Further the divider 173 connected in the latter stage makes division by a divisor 8 to calculate the pixel value A4 as indicated in the expression (8), its calculation result being output from the divider 173.

In this way, the pixel values of the pixels are simply added or subtracted, except that the pixel value e of the central pixel P5 is multiplied eightfold. And the number of adders or subtracters can be reduced as compared with the configuration as shown in FIG. 4, making it possible to lessen the processing contents, and further to carry out high-speed processing and simplify the circuit configuration.

Third Embodiment

In the first and second embodiments as described above, the pixel value e of the central pixel P5 is weighted by a weighting factor of 2 or greater (10 in the expression (1), 8 in the expression (5)) and the pixel values of other pixels are appropriately added or subtracted to calculate the pixel values A1 through A4 of the four pixels Q1 through Q4 located around the central pixel P5 as shown in FIG. 1. However, the degree to which the pixel values a through i of the nine pixels P1 through P9 has the effect may be computed employing a sampling function to obtain the correct coefficient values.

Figure 7:
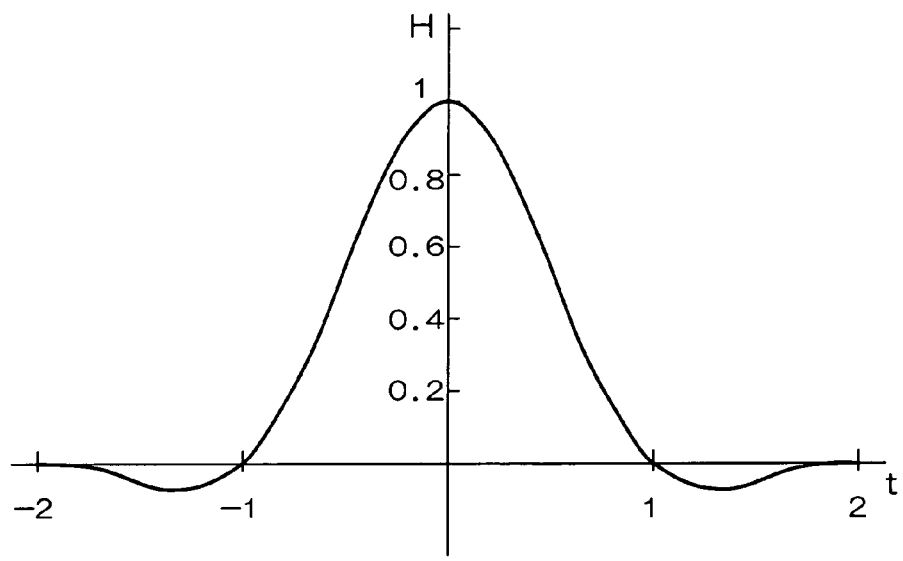
FIG. 7 is an explanatory view of a sampling function for use with the third embodiment.

FIG. 7 is an explanatory view of a sampling function for use with this embodiment. A sampling function H(t) shown in FIG. 7 is a function of a local support to which attention is paid on differentiability. For example, the function H(t) can be differentiated only once in the whole region and a function of a local support having finite values, which are not zeroes, when a sample position t along a horizontal axis is between −2 and +2. In addition, since being a sampling function, the sampling function H(t) is characterized in that the sampling function H(t) becomes one only at a sample point with t=0 and becomes zero at sample points with t=±1 and ±2.

Concretely, a function H(t) fulfilling various conditions described above (a sampling function, one-time differentiability, and a local support), with letting a third order B spline function be F(t), such a sampling function H(t) can be defined as:

$$H(t)=-F(t+1/2)/4+F(t)-F(t-1/2)/4.$$

Here, the third order B spline function F(t) is expressed as:

$$(4t^2+12t+9)/4; \ -3/2 \le t < -1/2$$

$$-2t^2+3/2; \ -1/2 \le t < 1/2$$

$$(4t^2-12t+9)/4; \ 1/2 \le t < 3/2$$

In addition, it is possible to express the above-mentioned sampling function H(t) by using a quadric piecewise polynomial as follows:

$$(-t^2-4t-4)/4; \ -2 \le t < -3/2$$

$$(3t^2+8t+5)/4; \ -3/2 \le t < -1$$

$$(5t^2+12t+7)/4; \ -1 \le t < -1/2$$

$$(-7t^2+4)/4; \ -1/2 \le t < 1/2$$

$$(5t^2-12t+7)/4; \ 1/2 \le t < 1$$

$$(3t^2-8t+5)/4; \ 1 \le t < 3/2$$

$$(-t^2+4t-4)/4; \ 3/2 \le t \le 2$$

The above-described sampling function H(t) is a quadric piecewise polynomial, and uses the third order B spline function F(t). Therefore, the function H(t) is a function of a local support that is guaranteed to be differentiable only once over the whole region. In addition, the function H(t) becomes zero at t=±1 and ±2.

In this manner, the above-described function H(t) is a sampling function and a function of a local support that can be differentiated only once over the whole region and converges to zero at t=±2. Therefore, it is possible to perform interpolation of a value between discrete pixel data using a function, which is differentiable only once, by performing convolution on the basis of respective discrete pixel data using this sampling function H(t).

Figure 8:
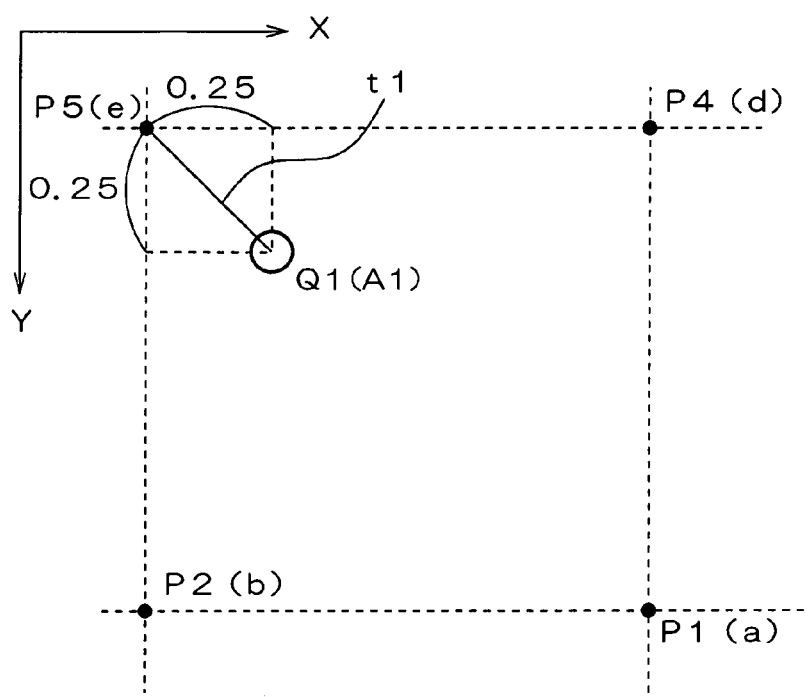
FIG. 8 is an explanatory view in performing a convolution operation of the pixel value of the pixel Q1 generated additionally, employing the pixel values of nine pixels P1 through P9.

FIG. 8 is an explanatory view in performing a convolution operation of the pixel value of the pixel Q1 generated additionally, employing the pixel values of nine pixels P1 through P9. For example, if two adjacent pixels on a scanning line are normalized to one, the distance t1 from the pixel Q1 to the central pixel P5 is obtained as $t1=\sqrt{\{(0.25)^2+(0.25)^2\}}=0.35$. Accordingly, if the specific values of the sampling function H(t1) are computed using this distance t1, the degree to which the pixel value e of the central pixel P5 has the effect on the pixel value A1 of the pixel Q1 can be obtained.

In this way, specifically, the degree to which the pixel values a through i of the nine pixels P1 through P9 has the effect on the pixel value A1 of the pixel Q1 is −0.027, 0.16, −0.071, 0.16, 0.79, −0.080, −0.071, −0.080, or −0.014. In practice, it is required to adjust each value to be closer to the integer by multiplying each of the nine values by an appropriate constant because the circuit becomes complex if any other numbers than the integer are multiplied. For example, multiplying each value by 10/0.79 so that the degree (0.79) to which the pixel value e has the effect on the central pixel P5 may be equal to 10, results in −0.34, 2.03, −0.90, 2.03, 10, −1.01, −0.90, −1.01, or −0.18. Among them, −0.34 and −0.18 are extremely smaller than 1, and can be ignored. From the above, the pixel value A1 of the pixel Q1 is obtained as follows.

$$A1=\{10e+2b+2d-(c+f+g+h)\}/10 \quad (9)$$

A reason why the result of addition and subtraction is divided by 10 in the right side of the expression (9) is that the pixel value A1 of the pixel Q1 is adjusted to have the same value, when the pixel values a through i of the nine pixels P1 through P9 are all the same value. The same adjustment has been made in the expressions (1) through (8) as cited above. Deviating from each coefficient computed employing the sampling function, the pixel value A1 of the pixel Q1 may be computed using $$A1=\{Le+2b+2d-(c+f+g+h)\}/L$$

where L is an integer of 2 or greater.

Similarly, the pixel values A2, A3 and A4 of three pixels Q2, Q3 and Q4 generated additionally around the central pixel P5 can be represented such as:

$$A2=\{Le+2b+2f-(a+d+h+i)\}/L$$

$$A3=\{Le+2d+2h-(a+b+f+i)\}/L$$

$$A4=\{Le+2f+2h-(b+c+d+g)\}/L$$

Substituting L=10 which is the suitable value obtained by the calculation employing the sampling function into the respective expressions, $$A2=\{10e+2b+2f-(a+d+h+i)\}/10 \quad (10)$$

$$A3=\{10e+2d+2h-(a+b+f+i)\}/10 \quad (11)$$

$$A4=\{10e+2f+2h-(b+c+d+g)\}/10 \quad (12)$$

Figure 9:
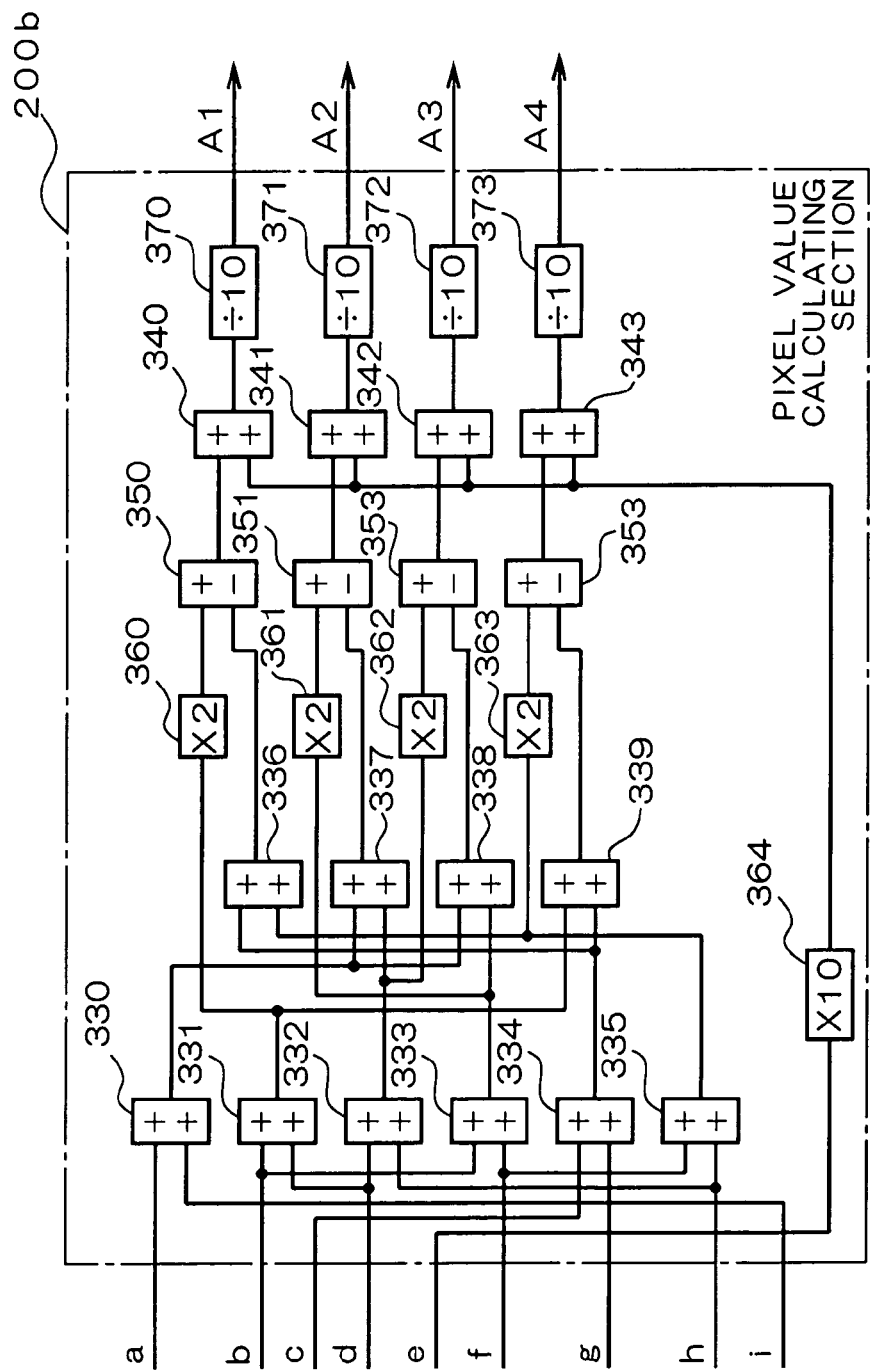
FIG. 9 is a block diagram showing the detailed configuration of a pixel value calculating section in the third embodiment.

FIG. 9 is a block diagram showing the detailed configuration of a pixel value calculating section 200b in this embodiment. The pixel value extracting section 100 connected in the former stage of the pixel value calculating section 200b and the pixel value output section 300 connected in the latter stage are the same as those included in the first embodiment, and the pixel value calculating section 200b will be only described.

As shown in FIG. 9, the pixel value calculating section 200b of this embodiment comprises fourteen adders 330 through 343, four subtracters 350 through 353, four multipliers 360 through 363 for making twofold multiplication, a multiplier 364 for making tenfold multiplication, and four dividers 370 through 373 for dividing the input value by a divisor 10. Four multipliers 360 through 363 can be implemented by shifting the wiring by one bit.

In the following, the operation of the pixel value calculating section 200b will be described for each pixel in the case where the pixel values A1 through A4 of four pixels Q1 through Q4 are calculated, employing the aforementioned expressions (9) through (12).

A calculation process of the pixel value A1 is performed employing the adders 331, 334, 335, 336, a subtracter 350 and a multiplier 360. More specifically, two pixel values b, d are added by an adder 331, and this addition result is doubled by the multiplier 360. And four pixel values c, f, g, h are added employing three adders 334, 335, 336. And by inputting the multiplication result of the multiplier 360 and the addition result of an adder 336 into the subtracter 350, an output value (2b+2d) that is the multiplication result output from the multiplier 360 subtracted by an output value (c+f+g+h) that is an addition result output from the adder 336 is output. Accordingly, with an adder 340 adding a multiplication result (10e) of the multiplier 364 to the output value, an addition result {10e+2b+2d−(c+f+g+h)} is output, and further divided by a divisor 10 by a divider 370 connected in the latter stage to calculate the pixel value A1 as indicated in the expression (9), its calculation result being output from the divider 370.

Also, a calculation process of the pixel value A2 is performed employing the adders 330, 332, 333, 337, a subtracter 351 and a multiplier 361. More specifically, two pixel values b, f are added by an adder 333, and this addition result is doubled by the multiplier 361. And four pixel values a, d, h, i are added employing three adders 330, 332, 337. And by inputting the multiplication result of the multiplier 361 and the addition result of an adder 337 into the subtracter 351, an output value (2b+2f) that is the multiplication result output from the multiplier 361 subtracted by an output value (a+d+h+i) that is an addition result output from the adder 337 is output. Accordingly, with an adder 341 adding a multiplication result (10e) of the multiplier 364 to the output value, an addition result {10e+2b+2f−(a+d+h+i)} is output, and further divided by a divisor 10 by a divider 371 connected in the latter stage to calculate the pixel value A2 as indicated in the expression (10), its calculation result being output from the divider 371.

Also, a calculation process of the pixel value A3 is performed using the adders 330, 332, 333, 338, a subtracter 352 and a multiplier 362. More specifically, two pixel values d, h are added by an adder 332, and this addition result is doubled by the multiplier 362. Also, four pixel values a, b, f, i are added employing three adders 330, 333, 338. And by inputting the multiplication result of the multiplier 362 and the addition result of an adder 338 into the subtracter 352, an output value (2d+2h) that is the multiplication result output from the multiplier 362 subtracted by an output value (a+b+f+i) that is an addition result output from the adder 338 is output. Accordingly, with an adder 342 adding a multiplication result (10e) of the multiplier 364 to the output value, an addition result {10e+2d+2h−(a+b+f+i)} is output, and further divided by a divisor 10 by a divider 372 connected in the latter stage to calculate the pixel value A3 as indicated in the expression (11), its calculation result being output from the divider 372.

Also, a calculation process of the pixel value A4 is performed using the adders 331, 334, 335, 339, a subtracter 353 and a multiplier 363. More specifically, two pixel values f, h are added by an adder 335, and this addition result is doubled by the multiplier 363. Also, four pixel values b, c, d, g are added employing three adders 331, 334, 339. And by inputting the multiplication result of the multiplier 363 and the addition result of an adder 339 into the subtracter 353, an output value (2f+2h) that is the multiplication result output from the multiplier 363 subtracted by an output value (b+c+d+g) that is an addition result output from the adder 339 is output. Accordingly, with an adder 343 adding a multiplication result (10e) of the multiplier 364 to the output value, an addition result {10e+2f+2h−(b+c+d+g)} is output, and further divided by a divisor 10 by a divider 373 connected in the latter stage to calculate the pixel value A4 as indicated in the expression (12), its calculation result being output from the divider 373.

In this way, the pixel values of the pixels are simply added or subtracted, except that the multipliers with the multiplying factors of 10 and 2 are employed. Hence, the processing contents can be simplified, and it is possible to carry out high-speed processing and provide the simple circuit configuration. Since the weighting factor of each pixel value is determined using the sampling function, the pixel value with the strict calculation result reflected can be obtained.

INDUSTRIAL APPLICABILITY

As described above, with this invention, four pixels are generated additionally around the central pixel on the basis of the pixel values of nine pixels, in which this generation process is performed while shifting the central pixel in a scan direction in order to transform the number of pixels in the horizontal and vertical directions into substantially twice. In particular, when four pixels are generated additionally around the central pixel, the pixel values of nine pixels including this central pixel are only employed. Hence, there are a small number of pixels to be processed, and it is possible to simplify a pixel generation (pixel value calculation) process and a circuit for performing the process as well as carrying out high-speed processing.

The invention claimed is:

1. An image processing circuit for transforming the number of scanning lines corresponding to an input signal and the number of pixels in a direction along a scanning line into substantially twice, characterized by comprising:

pixel value extracting unit for extracting pixel values of a total of nine pixels, three pixels in the horizontal direction along a scanning line by three pixels in the vertical direction in which the line and adjacent lines are abreast, from the pixel values of a plurality of pixels making up three adjacent scanning lines, in which the pixel values of pixels contained in said scanning line are input in a predetermined order corresponding to the scan direction of said scanning line;

pixel value calculating unit for calculating the pixel values of four additional pixels generated additionally corresponding to positions on the straight lines connecting a central pixel arranged in the center of said nine pixels and four peripheral pixels of said nine pixels, said four additional pixels being arranged in the oblique directions of the central pixel and at one-quarter the distance from said central pixel to said four peripheral pixels, on the basis of the pixel values of said nine pixels extracted by said pixel value extracting unit; and pixel value output unit for arranging a plurality of generated pixels having the pixel values calculated by said pixel value calculating unit in two columns along a horizontal direction by correlating them with one scanning line corresponding to the input signal, and outputting the pixel values of said generated pixels corresponding to each column in units of column.

2. The image processing circuit according to claim 1, characterized in that said pixel value extracting unit outputs in parallel the pixel value of a first pixel input at a predetermined timing, the pixel value of a second pixel delayed by one pixel from the output timing of said first pixel, the pixel value of a third pixel delayed by two pixels from the output timing of said first pixel, the pixel value of a fourth pixel delayed by one scanning line from the output timing of said first pixel, the pixel value of a fifth pixel delayed by one scanning line from the output timing of said second pixel, the pixel value of a sixth pixel delayed by one scanning line from the output timing of said third pixel, the pixel value of a seventh pixel delayed by two scanning lines from the output timing of said first pixel, the pixel value of an eighth pixel delayed by two scanning lines from the output timing of said second pixel, and the pixel value of a ninth pixel delayed by two scanning lines from the output timing of said third pixel.

3. The image processing circuit according to claim 1, characterized in that said pixel value calculating unit sets the pixel values A1, A2, A3, A4 of four pixels generated additionally around said central pixel such that:

$$A1=\{Ne+(a+b+d)-(c+f+g+h+i)\}/(N-2)$$

$$A2=\{Ne+(b+c+f)-(a+d+g+h+i)\}/(N-2)$$

$$A3=\{Ne+(d+g+h)-(a+b+c+f+i)\}/(N-2)$$

$$A4=\{Ne+(f+h+i)-(a+b+c+d+g)\}/(N-2)$$

where the pixel values of said nine pixels including said central pixel are a, b, c, d, e, f, g, h, and i in the scan order, and N is an integer of 3 or greater.

4. The image processing circuit according to claim 3, characterized in that by having the value of N to 10, said pixel values A1, A2, A3, A4 are set such that:

$$A1=\{10e+(a+b+d)-(c+f+g+h+i)\}/8$$

$$A2=\{10e+(b+c+f)-(a+d+g+h+i)\}/8$$

$$A3=\{10e+(d+g+h)-(a+b+c+f+i)\}/8$$

$$A4=\{10e+(f+h+i)-(a+b+c+d+g)\}/8.$$

5. The image processing circuit according to claim 1, characterized in that said pixel value calculating unit sets the pixel values A1, A2, A3, A4 of four pixels generated additionally around said central pixel such that:

$$A1=\{Me+(a+b+d)-(f+h+i)\}/M$$

$$A2=\{Me+(b+c+f)-(d+g+h)\}/M$$

$$A3=\{Me+(d+g+h)-(b+c+f)\}/M$$

$$A4=\{Me+(f+h+i)-(a+b+d)\}/M$$

where the pixel values of said nine pixels including said central pixel are a, b, c, d, e, f, g, h, and i in the scan order, and M is an integer of 2 or greater.

6. The image processing circuit according to claim 5, characterized in that by having the value of M to 8, said pixel values A1, A2, A3, A4 are set such that:

$$A1=\{8e+(a+b+d)-(f+h+i)\}/8$$

$$A2=\{8e+(b+c+f)-(d+g+h)\}/8$$

$$A3=\{8e+(d+g+h)-(b+c+f)\}/8$$

$$A4=\{8e+(f+h+i)-(a+b+d)\}/8.$$

7. The image processing circuit according to claim 1, characterized in that said pixel value calculating unit sets the pixel values A1, A2, A3, A4 of four pixels generated additionally around said central pixel such that:

$$A1=\{Le+2b+2d-(c+f+g+h)\}/L$$

$$A2=\{Le+2b+2f-(a+d+h+i)\}/L$$

$$A3=\{Le+2d+2h-(a+b+f+i)\}/L$$

$$A4=\{Le+2f+2h-(b+c+d+g)\}/L$$

where the pixel values of said nine pixels including said central pixel are a, b, c, d, e, f, g, h, and i in the scan order, and L is an integer of 2 or greater.

8. The image processing circuit according to claim 7, characterized in that by having the value of L to 10, said pixel values A1, A2, A3, A4 are set such that:

$$A1=\{10e+2b+2d-(c+f+g+h)\}/10$$

$$A2=\{10e+2b+2f-(a+d+h+i)\}/10$$

$$A3=\{10e+2d+2h-(a+b+f+i)\}/10$$

$$A4=\{10e+2f+2h-(b+c+d+g)\}/10.$$

9. The image processing circuit according to claim 1, characterized in that said pixel value output unit comprises first scanning line generating unit for storing and outputting the pixel values of two pixels generated additionally corresponding to the pixel contained in one scanning line where said central pixel is not contained in the order of arrangement along this scanning line, and second scanning line generating unit for storing and outputting the pixel values of two pixels generated additionally corresponding to the pixel contained in the other scanning line where said central pixel is not contained in the order of arrangement along this scanning line, and further comprises output pixel value selecting unit for selecting alternately the output operation of consecutive pixel values of one scanning line by the first and second scanning line generating unit to be made in the first scanning line generating unit or the second scanning line generating unit.

\* \* \* \* \*